United States Patent [19]

Hahn et al.

[11] Patent Number: 4,805,291
[45] Date of Patent: Feb. 21, 1989

[54] METHOD FOR MAKING A MOLD HALF FOR LAMINATED PARTS

[75] Inventors: Michael Hahn; Peter Wackerle, both of Ottobrunn; Peter Eschenfelder, Waldkraiburg; Ralf-Thilo Schulz, Herborn, all of Fed. Rep. of Germany

[73] Assignee: Messerschmitt-Bölkow-Blohm GmbH, Fed. Rep. of Germany

[21] Appl. No.: 70,421

[22] Filed: Jul. 7, 1987

Related U.S. Application Data

[60] Continuation-in-part of Ser. No. 899,749, Aug. 21, 1986, abandoned, which is a continuation of Ser. No. 726,924, Apr. 25, 1985, abandoned, which is a continuation of Ser. No. 487,846, Apr. 21, 1983, abandoned, which is a division of Ser. No. 212,194, Dec. 2, 1980, Pat. No. 4,398,693.

[30] Foreign Application Priority Data

Dec. 4, 1979 [DE] Fed. Rep. of Germany ....... 2948690

[51] Int. Cl.⁴ .............................................. B21D 5/00
[52] U.S. Cl. ......................................... 29/434; 72/379
[58] Field of Search .................. 72/342, 379; 249/139; 164/435; 493/395, 968; 52/80, 81, DIG. 10; 29/156.8 P, 434; 244/123

[56] References Cited

U.S. PATENT DOCUMENTS 1,781,160 11/1930 Carns .
1,790,144 1/1931 Haller .
2,121,654 6/1938 Donchian .
3,204,372 9/1965 Richter .
3,228,071 1/1966 Schultz .
3,298,076 1/1967 Soderlund .
3,893,277 7/1975 Constant .
3,952,574 4/1976 Speidel .
4,225,551 9/1980 Gault .

FOREIGN PATENT DOCUMENTS 799443 6/1936 France .
114872 10/1978 Japan .
1028853 5/1966 United Kingdom .

Primary Examiner—Lowell A. Larson
Attorney, Agent, or Firm—Toren, McGeady & Associates

[57] ABSTRACT

A mold component for forming a member consisting of a nondevelopable surface, such a member being an airfoil such as a wing or the like, is provided with an interior cavity in the shape of a developable surface which approximates the nondevelopable surface. In forming the mold cavity, points of equal tangential inclination on the non-developable surface are joined by straight lines and then the areas between the straight lines are formed as flat planar surfaces, thereby to form a developable surface which is an approximation of the non-developable surface. A flat planar development is then formed from this developable surface and bends are made therein at the straight lines in order to form thereby the mold cavity. A substantial number of said bends extend non-parallel to each other and none of the bends intersect.

4 Claims, 3 Drawing Sheets

METHOD FOR MAKING A MOLD HALF FOR LAMINATED PARTS

CROSS-REFERENCE TO RELATED APPLICATIONS

This is a continuation-in-part of pending application Ser. No. 899,749 filed Aug. 21, 1986 (now abandoned) which, in turn, was a continuation of application Ser. No. 726,924 filed Apr. 25, 1985, now abandoned, and which was a continuation of application Ser.No. 487,846 filed Apr. 21, 1983, now abandoned, which, in turn, was a division of application Ser. No. 212,194 filed Dec. 2, 1980, now U.S. Pat. No. 4,398,693.

BACKGROUND OF THE INVENTION

1. Field of the Invention

The present invention relates generally to molding apparatus and, more particularly, to a method for making a mold half, and specifically, a laminating mold half which is utilized for parts to be molded from fiber components. The mold half of the invention is formed with an inside surface matching the negative contour of the part to be molded therein. More particularly, the invention is directed toward making a molded component which consists of a nondevelopable surface and which is closely approximated by a developable surface.

2. Description of Related Art

As used herein, the term "nondevelopable surface" relates to a surface from which a planar development cannot be made without stretching or otherwise distorting the surface. An aerodynamic surface is an example of a nondevelopable surface.

In order to produce laminated parts, such as, for example, wings for gliders, from fiber compounds, molds which are made of plastic are utilized. When such molds are used for the manufacture of large sized parts, a coldsetting resin system cannot be utilized because of a short dropping time which is involved. However, the process of thermosetting is usually not a practical possibility in plastic molds. It has furthermore been found that the plastic mold surface will be highly stressed by the removal of the molded part from the mold and will require frequent repair. Additionally, production costs of such plastic molds tend to be high.

It is also known to use milled metal molds in order to produce the parts discussed above. Although a thermosetting process is possible in such molds, an expensive heating system is required in order to assure uniform heating of the mold without distortion. The mass of such a mold tends to be very great, so that production, transportation and installation of molds of this type tend to be costly. Moreover, the size of the mold is limited by the capacity of machine tools which are necessary in order to produce such molds.

SUMMARY OF THE INVENTION

It is, acccordingly, an object of the present invention to provide a mold half of the type described whereby the disadvantages of plastic molds and milled metal molds may be overcome and which may be made inexpensively while also being suitable for the manufacture of very large parts, particularly very long parts and especially those with curved surfaces.

Briefly, the present invention may be described as a method for forming a molded component which closely approximates a component consisting of a nondevelopable surface.

In the practice of the invention, first, on a curved nondevelopable surface component which is identical with the nondevelopable surface to be approximated, there are determined points having equal tangential slope at locations remote from each other. These constitute profile points of equal tangential inclination and these profile points are next connected by straight lines. Subsequently, the surface areas between the straight lines are interconnected successively by planar surface areas, thereby converting the nondevelopable surface into a developable surface. From this developable surface thus formed, there is then formed a flat, planar development having the aforementioned straight lines thereon. Subsequently, the flat or planar development thus formed is bent along each of the straight lines with a bending angle as defined by the corresponding intersecting angle of the planar surface areas formed previously between the straight lines in order thereby to form a cavity which has an inner surface identical to the surface formed above by providing the planar surface areas between the straight lines.

This bent development constitutes a mold cavity which is used to form the desired molded component approximating the nondevelopable surface mentioned initially.

The mold half in accordance with the invention offers the advantage that it is extremely simple to produce while essentially conforming to the negative contour of the part which is to be manufactured therein. The mold will resist bending, is twistable, wear resistant, and vacuum tight. It is suited for the manufacture of very long parts because such parts need only be divided in the longitudinal direction. The mold halves corresponding to this division can be filed in the desired manner so as to be mutually adjacent.

The fastening means of the support may be disposed in adaptation to the deformation of the plate material and to an additional elastic distortion of the material. This has the advantage that, by simple means, a desired twist can be imparted to the part to be produced, which twist need not be taken into account as yet when deformation of the workpiece to adapt it to the basic shape of the part is to be performed. In this manner, items, such as, for example, rotor blades, may be produced in an extremely simple way with the required twist, with the twist of the mold half being variable at any time as to magnitude and direction of rotation.

The fastening means of the support member are disposed essentially at points, or punctiformly, along two mutually parallel axes, with only a single fastening means being provided to fix the deformed material at a stationary point, with the other fastening means on this axis being deflectable in the direction of the axis while the fastening means on the other axis are deflectable in the latter's direction and transverse thereto.

The advantage of this arrangement is that the mold half may be thermally decoupled from the support and yet the required fixation of the deformed material will be assured even when the twist is taken into account.

In order to arrive at this relatively quite simple mold half design, the surface of the part to be produced in the mold, e.g., a main wing or a rotor blade, is lofted numerically. The outline is then divided into planar areas between the straight lines connecting profile points of the same tangent inclination. These areas are juxtaposed in the plane development and separated by the straight lines. By bending the sheet metal along the straight lines at the angles given as a function of the shape of the part, the actual mold cup may be obtained, whose support and fixing means provide for the retention of the constancy of shape, thermal decoupling being possible in the manner described.

It is expedient for the plastically deformable, plate-shaped material to be a sheet metal member.

The mold cup produced in the manner in accordance with the invention, e.g., of sheet metal, its support and fixing means will together result in a laminating mold half which makes possible the manufacture of very large plastic parts in one procedure with a thermosetting capacity. The mold can be heated, for example, by hot air. When not in use for temporary periods of time, the mold half can be taken apart in a simple manner and it may be stored. If required, components of the mold may be again used in other laminating mold halves.

A mold produced in accordance with the present invention will permit a significant degree of variation in the geometry of the mold with respect to twisting and length. Furthermore, such a mold half will have a rather long useful life particularly when steel sheet is used.

In order to produce mold halves, the plate-shaped material is plastically deformed along deformation lines at predetermined angles to attain the negative contour of the part. The material so deformed is affixed to a support member which assures retention of the negative contour.

The elastic distortion may be permanently imparted to the deformed material when it is affixed to the support member. The deformed material may be fixed to the support member in a manner so as to permit thermal expansion. The plate-shaped material blank is usually cut in accordance with a development resulting from division of the outline of the part into sections. This material blank is then deformed along straight bending lines which connect profile points of the part having the same tangent inclination.

The various features of novelty which characterize the invention are pointed out with particularity in the claims annexed to and forming a part of this disclosure. For a better understanding of the invention, its operating advantages and specific objectives attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
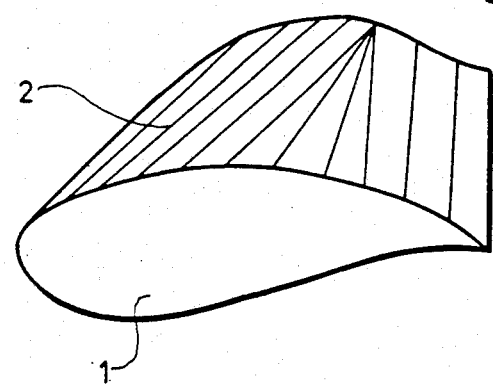
FIG. 1 is a perspective view showing a wing section consisting of a nondevelopable surface with straight bending lines.

Referring first to FIG. 1 of the drawings, it will be seen that the top of a wing section 1 comprising a nondevelopable surface shown therein is longitudinally divided into sections or sectional parts by nonintersecting straight lines 2 which are drawn so as to connect profile points remote from each other having the same, equivalent tangential slope or inclination.

These profile points are mutually spaced apart on opposite sides of the airfoil or wing section 1 in accordance with the required curvature approximation. Subsequently, sectional portions of the wing surface between the straight lines 2 are replaced or substituted by planar areas and, as a result of this substitution with the planar areas, a developable surface approximating the nondevelopable surface of the airfoil 1 is thus obtained.

Figure 2:
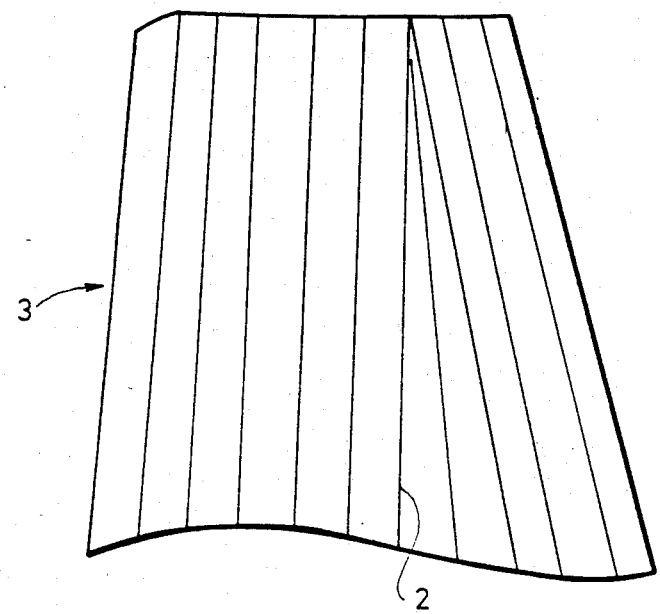
FIG. 2 is a development of an approximation of the upper portion of the wing section of FIG. 1 shown with the bending lines.
Figure 4:
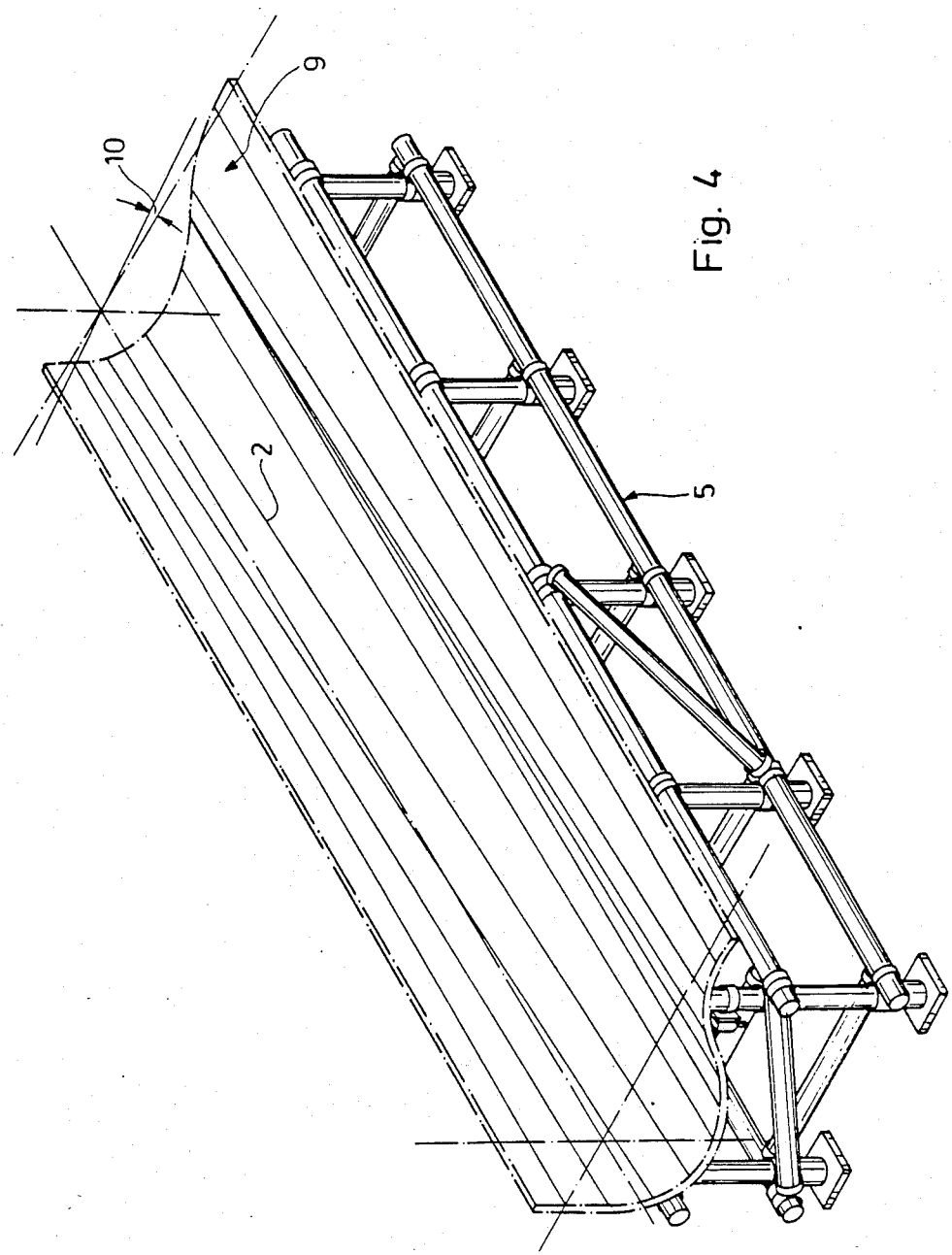
FIG. 4 is a perspective view showing the support member of FIG. 3 with the deformed material affixed thereto.

Subsequent to this, a flat development 3 of the developable surface approximating the upper wing half shown in FIG. 1 may thus be obtained and this development is depicted in FIG. 2. A piece of sheet metal may now be cut to conform to this development and it may be bent along the previously scribed straight bending lines at angles determined as a function of the profile of curvature. A mold cup may thus be obtained and a bottom mold 9 obtained in this fashion is shown in FIG. 4. The bending lines 2 shown in FIG. 2 and the bending lines 2 shown in FIG. 4 completely correspond to each other. It will be seen particularly from FIG. 1 that the bending lines have nonuniform bending angles.

It will be understood that with regard to the transposal of the straight connecting lines 2 which are located on the bent developable surface, which approximates the nondevelopable surface of the airfoil 1, onto the planar development 3 of this surface is a routine measure for one skilled in the art since mutual distances between neighboring connecting lines and the length of the connecting lines remain unchanged during the development. In the course of the practical application of the invention, the precise shape of the development including the position of the straight or bending lines 2 and the associated bending angle may be determined by calculations, for example, by means of a computer program proceeding from a preset or predetermined nondevelopable airfoil profile, such as that depicted in FIG. 1.

After the flat development shown in FIG. 2 is bent along the straight or bending lines 3 in order to form the mold cavity or bottom mold 9, a molded component using this mold may be formed.

Final machining of such a molded component is not required because the nondevelopable surface will be approximated by the developable polyhedral surface as accurately as will be required for intended purposes. Thus, the deviation between the final molded component and the desired nondevelopable or airfoil surface can be maintained below predetermined tolerance limits if the connecting lines are spaced sufficiently close to each other. In this case, the molded component constitutes a developable surface which, however, approximates very accurately the desired nondevelopable surface.

If a closer conformance is desired, it would also be possible to grind or otherwise treat the molded component especially in the region of the end edges of the mold's cavity and, thus, to approximate to a greater degree the desired nondevelopable surface. In practical application, a composite fiber wind-driven foil may be fabricated which, in any case, after hardening of the composite fiber material may be treated with a filler mass and then finishvarnished. Thereby, the areas where the bends occur on the developable composite fiber surface may be compensated by the application of the filler so that a finished wing having a completely smooth varnished surface corresponding to the airfoil proile may be obtained.

Figure 3:
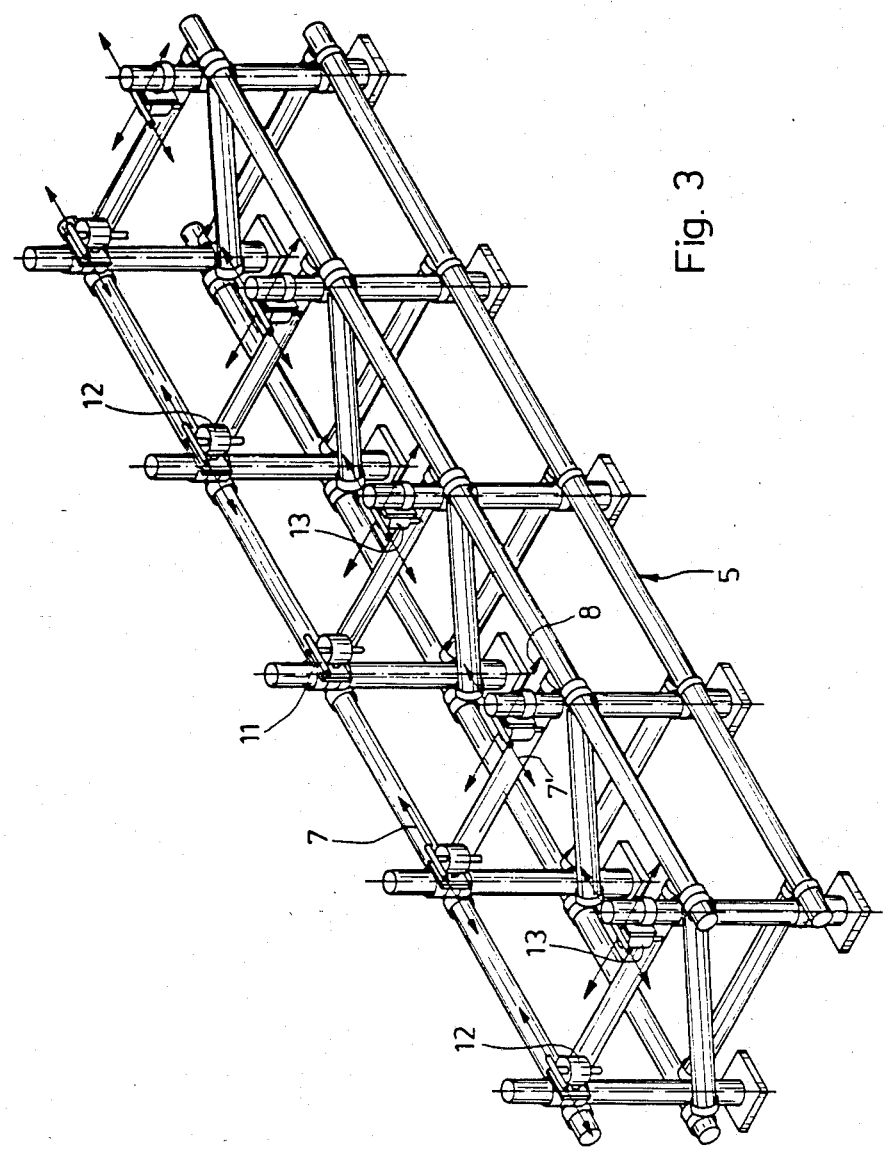
FIG. 3 is a perspective view of an embodiment of a mold support for the material deformed along the bending lines and for its fixation with a distortion imparted thereto for thermal decoupling.

In FIGS. 3 and 4, there is shown a support structure with which the mold 9 formed by the method of the present invention may be utilized.

The bottom mold 9 shown in FIG. 4 is mounted and affixed onto a support member 5 shown in FIGS. 3 and 4 which is composed on a frame comprising posts and cross members. This mounting and fixing technique is accomplished by fastening means 12 and 13 which are height-adjustable upon and lockable to the frame, the fastening means 12 being disposed on one long side of the support member 5 on an axis extending in the direction of arrows 7. The fastening means 13 are disposed on another long side of the support member 5 in the direction of an axis represented by the arrows 7'.

The bottom mold 9 is affixed to the fastening means 11 mounted on the axis 7 of the fastening means 12 so that relative motion between the bottom mold 9 and the support 5 cannot occur at this point. The fastening means 12 are designed so that relative motion between the support 5 and the bottom mold 9 is possible in the direction of the arrows 7. The fastening means 13 are mounted to the support member 5 so that relative motion between the bottom mold 9 and the fastening means 13 is possible in the direction of the arrows 7' and perpendicular thereto in the direction of the arrows 8, i.e., transverse to the axes.

Due to this fastening technique, the bottom mold 9 is affixed to the support member 5 by means of the fastening means 11, but is thermally decoupled so that free thermal expansion of the bottom mold 9 and, hence, retention of the profile shape may be assured when thermosetting systems are used in the mold half.

As may be seen from FIG. 4, elastic deformation or distortion represented by angle 10 may be imparted to the bottom mold 9 in the longitudinal direction. This distortion is fixed by the fastening means 11, 12 and 13.

While a specific embodiment of the invention has been shown and described in detail to illustrate the application of the inventive principles, it will be understood that the invention may be embodied otherwise without departing frorm such principles.

What is claimed is:

1. A method for forming a molded component consisting of a developable surface which approximates a nondevelopable surface comprising the steps of:
    determining a nondevelopable surface to be approximated by a mold component and forming on an identical nondevelopable surface points having equal tangential slopes at profile lines remote from each other;
    connecting said profile points of equal tangential slopes on said nondevelopable surface with nonintersecting straight lines;
    forming planar surface areas successively between each of said straight lines thereby to convert said nondevelopable surface into a developable surface;
    forming from said developable surface thus formed a flat development having said straight lines thereon;
    bending said flat development along each of said straight lines with a bending angle defined by the corresponding intersecting angle of said planar surface areas existing prior to formation of said flat development in order thereby to form a mold member defining a mold cavity having an inner surface identical with said developable surface; and
    utilizing said mold member to form a molded component.

2. A method according to claim 1, further comprising the step of supporting said mold member upon a support structure having fastening means interposed between said mold member and said support structure for enabling adjustable movement therebetween.

3. A method according to claim 1, further comprising the steps of:
    supporting said mold member upon a support structure by interposing between said mold member and said support structure first fastening means comprising a single fastening member immovably fixing said mold member to said support structure and located along a first linear axis;
    second fastening means comprising a plurality of fastening members located along said first linear axis and arranged for allowing deflection of said mold member relative to said support structure in directions along said first axis; and
    third fastening means comprising a plurality of fastening members located along a second linear axis parallel to said first linear axis, said fastening members of said third fastening means being arranged for allowing deflection of said mold member relative to said support structure in directions along said second linenar axis as well as in directions transverse thereto.

4. A method according to claim 3, further comprising the steps of arranging said first, second and third fastening means to adapt to elastic distortion of the mold member relative to the support structure.

* * * * *